(12) United States Patent
Versteyhe et al.

(10) Patent No.: US 9,353,842 B2
(45) Date of Patent: May 31, 2016

(54) BALL TYPE CVT WITH POWERSPLIT PATHS

(71) Applicant: DANA LIMITED, Maumee, OH (US)

(72) Inventors: Mark R. J. Versteyhe, Oostkamp (BE); Matthias W. J. Byltiauw, Hooglede (BE)

(73) Assignee: DANA LIMITED, Maumee, OH (US)

( * ) Notice: Subject to any disclaimer, the term of this patent is extended or adjusted under 35 U.S.C. 154(b) by 0 days.

(21) Appl. No.: 14/426,139

(22) PCT Filed: Sep. 6, 2013

(86) PCT No.: PCT/US2013/058615
§ 371 (c)(1),
(2) Date: Mar. 4, 2015

(87) PCT Pub. No.: WO2014/039900
PCT Pub. Date: Mar. 13, 2014

(65) Prior Publication Data
US 2015/0204430 A1 Jul. 23, 2015

Related U.S. Application Data

(60) Provisional application No. 61/789,645, filed on Mar. 15, 2013, provisional application No. 61/698,012, filed on Sep. 7, 2012.

(51) Int. Cl.
*B60W 10/11* (2012.01)
*F16H 37/08* (2006.01)
(Continued)

(52) U.S. Cl.
CPC ............ *F16H 37/086* (2013.01); *F16H 15/503* (2013.01); *F16H 15/28* (2013.01); *F16H 2037/0873* (2013.01); *F16H 2037/103* (2013.01)

(58) Field of Classification Search
CPC ............ F16H 15/503; F16H 2059/088; F16H 2061/1232; F16H 2312/09; F16H 61/0246; F16H 61/0403
See application file for complete search history.

(56) References Cited

U.S. PATENT DOCUMENTS 1,063,244 A 6/1913 Dieterich
1,215,969 A 2/1917 Murray
(Continued)

FOREIGN PATENT DOCUMENTS

AU 2011224083 A1 10/2011
DE 1237380 B 3/1967
(Continued)

OTHER PUBLICATIONS

PCT/US2013/021890 International Preliminary Report on Patentability dated Jul. 31, 2014.
(Continued)

*Primary Examiner* — Derek D Knight
(74) *Attorney, Agent, or Firm* — Wilson Sonsini Goodrich & Rosati

(57) ABSTRACT

A variable transmission comprises an input shaft; three planetary gear sets; a Ravigneaux gear set; a variator comprising, a first ring assembly, a second ring assembly, a carrier assembly; various arrangements of brakes and clutches; and the output shaft. The variable transmissions comprise a continuously variable mode, an infinitely variable mode, or a combination thereof and can provide an input-coupled powersplit solution function. At least one configuration of the variable transmission comprises a direct drive mode.

27 Claims, 8 Drawing Sheets

(51) Int. Cl.
  *F16H 15/50* (2006.01)
  *F16H 15/28* (2006.01)
  *F16H 37/10* (2006.01)

(56) References Cited

U.S. PATENT DOCUMENTS

| | | | |
|---|---|---|---|
| 1,526,140 A | 2/1925 | Gruver |
| 2,019,006 A | 10/1935 | Ferrari |
| 2,060,884 A | 11/1936 | Madle |
| 2,405,201 A | 8/1946 | Franck |
| 2,660,897 A | 12/1953 | Neidhart et al. |
| 2,729,118 A | 1/1956 | Emslie |
| 2,931,235 A | 4/1960 | Hayward |
| 3,203,278 A | 8/1965 | General |
| 3,407,687 A | 10/1968 | Hayashi |
| 3,470,720 A | 10/1969 | Eklund et al. |
| 3,583,060 A | 6/1971 | Sigmans |
| 3,774,280 A | 11/1973 | Eklund et al. |
| 3,831,245 A | 8/1974 | Amos |
| 3,894,559 A | 7/1975 | DePuy |
| 4,046,988 A | 9/1977 | Okuda et al. |
| 4,226,140 A | 10/1980 | Gaasenbeek |
| 4,333,358 A | 6/1982 | Grattapaglia |
| 4,368,572 A | 1/1983 | Kanazawa et al. |
| 4,464,952 A | 8/1984 | Stubbs |
| 4,693,134 A | 9/1987 | Kraus |
| 4,731,044 A | 3/1988 | Mott |
| 4,784,017 A | 11/1988 | Johnshoy |
| 4,856,371 A | 8/1989 | Kemper |
| 4,856,374 A | 8/1989 | Kreuzer |
| 4,950,208 A | 8/1990 | Tomlinson |
| 4,963,122 A | 10/1990 | Ryan |
| 4,963,124 A | 10/1990 | Takahashi et al. |
| 5,109,962 A | 5/1992 | Sato |
| 5,217,412 A | 6/1993 | Indlekofer et al. |
| 5,230,670 A | 7/1993 | Hibi |
| 5,238,460 A | 8/1993 | Esaki et al. |
| 5,318,486 A | 6/1994 | Lutz |
| 5,390,759 A | 2/1995 | Gollner |
| 5,401,221 A | 3/1995 | Fellows et al. |
| 5,520,588 A | 5/1996 | Hall, III |
| 5,527,231 A | 6/1996 | Seidel et al. |
| 5,577,423 A | 11/1996 | Mimura |
| 5,599,251 A | 2/1997 | Beim et al. |
| 5,659,956 A | 8/1997 | Braginsky et al. |
| 5,683,322 A | 11/1997 | Meyerle |
| 5,726,353 A | 3/1998 | Matsuda et al. |
| 5,730,678 A | 3/1998 | Larkin |
| 5,766,105 A | 6/1998 | Fellows et al. |
| 5,776,028 A | 7/1998 | Matsuda et al. |
| 5,800,303 A | 9/1998 | Benford |
| 5,860,888 A | 1/1999 | Lee |
| 5,915,801 A | 6/1999 | Taga et al. |
| 5,971,883 A | 10/1999 | Klemen |
| 5,996,226 A | 12/1999 | Gibbs |
| 6,009,365 A | 12/1999 | Takahara et al. |
| 6,045,477 A | 4/2000 | Schmidt |
| 6,053,839 A | 4/2000 | Baldwin et al. |
| 6,059,685 A | 5/2000 | Hoge et al. |
| 6,071,208 A | 6/2000 | Koivunen |
| 6,080,080 A | 6/2000 | Bolz et al. |
| 6,083,135 A | 7/2000 | Baldwin et al. |
| 6,086,504 A | 7/2000 | Illerhaus |
| 6,089,287 A | 7/2000 | Welsh et al. |
| 6,095,942 A | 8/2000 | Yamaguchi et al. |
| 6,155,951 A | 12/2000 | Kuhn et al. |
| 6,217,474 B1 | 4/2001 | Ross et al. |
| 6,251,038 B1 | 6/2001 | Ishikawa et al. |
| 6,273,838 B1 | 8/2001 | Park |
| 6,342,026 B1 | 1/2002 | Takagi et al. |
| 6,358,178 B1 | 3/2002 | Wittkopp |
| 6,371,880 B1 | 4/2002 | Kam |
| 6,481,258 B1 | 11/2002 | Belinky |
| 6,554,735 B2 | 4/2003 | Kanazawa |
| 6,558,285 B1 | 5/2003 | Sieber |
| 6,585,619 B2 | 7/2003 | Henzler |
| 6,609,994 B2 | 8/2003 | Muramoto |
| 6,641,497 B2 | 11/2003 | Deschamps et al. |
| 6,645,106 B2 | 11/2003 | Goo et al. |
| 6,705,964 B2 | 3/2004 | Nagai et al. |
| 6,719,659 B2 | 4/2004 | Geiberger et al. |
| 6,723,016 B2 | 4/2004 | Sumi |
| 6,726,590 B2 | 4/2004 | Henzler et al. |
| 6,733,412 B2 | 5/2004 | Kumagai et al. |
| 6,752,696 B2 | 6/2004 | Murai et al. |
| 6,793,603 B2 | 9/2004 | Teraoka et al. |
| 6,849,020 B2 | 2/2005 | Sumi |
| 6,866,606 B2 | 3/2005 | Ooyama |
| 6,949,045 B2 | 9/2005 | Wafzig et al. |
| 6,979,275 B2 | 12/2005 | Hiraku et al. |
| 7,033,298 B2 | 4/2006 | Usoro et al. |
| 7,074,154 B2 | 7/2006 | Miller |
| 7,104,917 B2 | 9/2006 | Klemen et al. |
| 7,128,681 B2 | 10/2006 | Sugino et al. |
| 7,160,220 B2 | 1/2007 | Shinojima et al. |
| 7,186,199 B1 | 3/2007 | Baxter, Jr. |
| 7,234,543 B2 | 6/2007 | Schaaf |
| 7,288,044 B2 | 10/2007 | Gumpoltsberger |
| 7,335,126 B2 | 2/2008 | Tsuchiya et al. |
| 7,347,801 B2 | 3/2008 | Guenter et al. |
| 7,396,309 B2 | 7/2008 | Heitz et al. |
| 7,431,677 B2 | 10/2008 | Miller et al. |
| 7,470,210 B2 | 12/2008 | Miller et al. |
| 7,473,202 B2 | 1/2009 | Morscheck et al. |
| 7,485,069 B2 | 2/2009 | Jang et al. |
| 7,497,798 B2 | 3/2009 | Kim |
| 7,588,514 B2 | 9/2009 | McKenzie et al. |
| 7,637,838 B2 | 12/2009 | Gumpoltsberger |
| 7,672,770 B2 | 3/2010 | Inoue et al. |
| 7,686,729 B2 | 3/2010 | Miller et al. |
| 7,717,815 B2 | 5/2010 | Tenberge |
| 7,727,107 B2 | 6/2010 | Miller |
| 7,780,566 B2 | 8/2010 | Seo |
| 7,874,153 B2 | 1/2011 | Behm |
| 7,878,935 B2 | 2/2011 | Lahr |
| 7,951,035 B2 | 5/2011 | Platt |
| 7,980,972 B1 | 7/2011 | Starkey et al. |
| 8,029,401 B2 | 10/2011 | Johnson |
| 8,052,569 B2 | 11/2011 | Tabata et al. |
| 8,062,175 B2 | 11/2011 | Krueger et al. |
| 8,066,614 B2 | 11/2011 | Miller et al. |
| 8,142,323 B2 * | 3/2012 | Tsuchiya ............ F16H 37/086 475/216 |
| 8,226,518 B2 | 7/2012 | Parraga Gimeno |
| 8,257,216 B2 | 9/2012 | Hoffman |
| 8,257,217 B2 | 9/2012 | Hoffman |
| 8,287,414 B2 | 10/2012 | Weber et al. |
| 8,313,404 B2 | 11/2012 | Carter et al. |
| 8,382,636 B2 | 2/2013 | Shiina et al. |
| 8,545,368 B1 | 10/2013 | Davis et al. |
| 8,594,867 B2 | 11/2013 | Heap et al. |
| 8,639,419 B2 | 1/2014 | Roli et al. |
| 8,678,975 B2 | 3/2014 | Koike |
| 8,870,711 B2 | 10/2014 | Pohl et al. |
| 8,888,643 B2 | 11/2014 | Lohr et al. |
| 8,926,468 B2 | 1/2015 | Versteyhe et al. |
| 8,986,150 B2 | 3/2015 | Versteyhe et al. |
| 9,114,799 B2 | 8/2015 | Tsukamoto et al. |
| 9,156,463 B2 | 10/2015 | Legner et al. |
| 2002/0094911 A1 | 7/2002 | Haka |
| 2002/0169048 A1 | 11/2002 | Henzler et al. |
| 2003/0060318 A1 | 3/2003 | Sumi |
| 2003/0181280 A1 | 9/2003 | Elser et al. |
| 2003/0200783 A1 | 10/2003 | Shai |
| 2003/0213125 A1 | 11/2003 | Chiuchang |
| 2003/0216121 A1 | 11/2003 | Yarkosky |
| 2003/0228952 A1 | 12/2003 | Joe et al. |
| 2004/0058769 A1 | 3/2004 | Larkin |
| 2004/0061639 A1 | 4/2004 | Voigtlaender et al. |
| 2004/0166984 A1 | 8/2004 | Inoue |
| 2004/0171452 A1 | 9/2004 | Miller et al. |
| 2005/0102082 A1 | 5/2005 | Joe et al. |
| 2005/0137046 A1 | 6/2005 | Miller et al. |
| 2005/0153810 A1 | 7/2005 | Miller et al. |

(56) References Cited

U.S. PATENT DOCUMENTS

| | | |
|---|---|---|
| 2006/0234822 A1 | 10/2006 | Morscheck et al. |
| 2007/0021259 A1 | 1/2007 | Tenberge |
| 2007/0032327 A1 | 2/2007 | Raghavan et al. |
| 2007/0042856 A1 | 2/2007 | Greenwood et al. |
| 2007/0072732 A1 | 3/2007 | Klemen |
| 2007/0096556 A1 | 5/2007 | Kokubo et al. |
| 2007/0270270 A1 | 11/2007 | Miller et al. |
| 2007/0275808 A1 | 11/2007 | Iwanaka et al. |
| 2008/0039273 A1 | 2/2008 | Smithson et al. |
| 2008/0103002 A1 | 5/2008 | Holmes |
| 2008/0121487 A1 | 5/2008 | Miller et al. |
| 2008/0185201 A1 | 8/2008 | Bishop |
| 2009/0017959 A1 | 1/2009 | Triller |
| 2009/0048054 A1 | 2/2009 | Tsuchiya et al. |
| 2009/0062064 A1 | 3/2009 | Kamada et al. |
| 2009/0132135 A1 | 5/2009 | Quinn, Jr. et al. |
| 2009/0221391 A1 | 9/2009 | Bazyn et al. |
| 2009/0221393 A1 | 9/2009 | Kassler |
| 2009/0286651 A1 | 11/2009 | Tanaka et al. |
| 2009/0312137 A1 | 12/2009 | Rohs et al. |
| 2010/0056322 A1 | 3/2010 | Thomassy |
| 2010/0093476 A1 | 4/2010 | Carter et al. |
| 2010/0093479 A1* | 4/2010 | Carter ............... F16H 15/28 475/159 |
| 2010/0106386 A1 | 4/2010 | Krasznai et al. |
| 2010/0113211 A1 | 5/2010 | Schneider et al. |
| 2010/0141193 A1 | 6/2010 | Rotondo et al. |
| 2010/0244755 A1 | 9/2010 | Kinugasa et al. |
| 2010/0267510 A1 | 10/2010 | Nichols et al. |
| 2010/0282020 A1 | 11/2010 | Greenwood et al. |
| 2010/0304915 A1 | 12/2010 | Lahr |
| 2010/0310815 A1 | 12/2010 | Mendonca Alves et al. |
| 2011/0015021 A1 | 1/2011 | Maguire et al. |
| 2011/0034284 A1 | 2/2011 | Pohl et al. |
| 2011/0152031 A1 | 6/2011 | Schoolcraft |
| 2011/0165982 A1 | 7/2011 | Hoffman et al. |
| 2011/0165985 A1 | 7/2011 | Hoffman et al. |
| 2011/0165986 A1 | 7/2011 | Hoffman et al. |
| 2011/0230297 A1 | 9/2011 | Shiina et al. |
| 2011/0319222 A1 | 12/2011 | Ogawa et al. |
| 2012/0024991 A1 | 2/2012 | Pilch et al. |
| 2012/0035016 A1 | 2/2012 | Miller et al. |
| 2012/0040794 A1* | 2/2012 | Schoolcraft ........... F16H 37/086 475/207 |
| 2012/0122624 A1* | 5/2012 | Hawkins, Jr. ........ F16H 37/086 475/219 |
| 2012/0142477 A1* | 6/2012 | Winter ................. F16H 37/086 475/192 |
| 2012/0165154 A1 | 6/2012 | Wittkopp et al. |
| 2012/0231925 A1 | 9/2012 | Shiina et al. |
| 2012/0244990 A1 | 9/2012 | Ogawa et al. |
| 2012/0309579 A1 | 12/2012 | Miller et al. |
| 2013/0130859 A1* | 5/2013 | Lundberg ............. F16H 37/022 475/214 |
| 2013/0133965 A1 | 5/2013 | Books |
| 2013/0190131 A1* | 7/2013 | Versteyhe ............ F16H 15/40 476/31 |
| 2013/0226416 A1 | 8/2013 | Seipold et al. |
| 2013/0303325 A1* | 11/2013 | Carey .................. F16H 37/022 475/214 |
| 2013/0304344 A1 | 11/2013 | Abe |
| 2014/0194242 A1 | 7/2014 | Cooper |
| 2014/0194243 A1* | 7/2014 | Versteyhe ............ F16H 15/52 475/188 |
| 2014/0223901 A1 | 8/2014 | Versteyhe et al. |
| 2014/0274536 A1 | 9/2014 | Versteyhe et al. |
| 2014/0274552 A1 | 9/2014 | Frink et al. |
| 2015/0024899 A1 | 1/2015 | Phillips |
| 2015/0204429 A1 | 7/2015 | Versteyhe et al. |
| 2015/0226294 A1 | 8/2015 | Ziech et al. |
| 2015/0226298 A1 | 8/2015 | Versteyhe |
| 2015/0226299 A1 | 8/2015 | Cooper et al. |
| 2015/0252881 A1 | 9/2015 | Versteyhe |

FOREIGN PATENT DOCUMENTS

| | | |
|---|---|---|
| DE | 3245045 A1 | 6/1984 |
| DE | 102005010751 A1 | 9/2006 |
| EP | 0156936 A1 | 10/1985 |
| EP | 0210053 A2 | 1/1987 |
| EP | 1061288 A2 | 12/2000 |
| EP | 2113056 B1 | 7/2012 |
| FR | 1030702 A | 6/1953 |
| FR | 1472282 A | 3/1967 |
| FR | 2280451 A1 | 2/1976 |
| FR | 2918433 A1 | 1/2009 |
| GB | 1127825 A | 9/1968 |
| GB | 2248895 A | 4/1992 |
| JP | H09119506 A | 5/1997 |
| JP | 2008180214 A | 8/2008 |
| JP | 2011153583 A | 8/2011 |
| WO | WO-2006002457 A1 | 1/2006 |
| WO | WO-2006041718 A2 | 4/2006 |
| WO | WO-2007046722 A1 | 4/2007 |
| WO | WO-2007051827 A1 | 5/2007 |
| WO | WO-2008103543 A1 | 8/2008 |
| WO | WO-2011011991 A1 | 2/2011 |
| WO | WO-2012008884 A1 | 1/2012 |
| WO | WO-2012177187 A1 | 12/2012 |
| WO | WO-2013109723 A1 | 7/2013 |
| WO | WO-2013123117 A1 | 8/2013 |
| WO | WO-2014039438 A2 | 3/2014 |
| WO | WO-2014039439 A1 | 3/2014 |
| WO | WO-2014039440 A1 | 3/2014 |
| WO | WO-2014039447 A1 | 3/2014 |
| WO | WO-2014039448 A2 | 3/2014 |
| WO | WO-2014039708 A1 | 3/2014 |
| WO | WO-2014039713 A1 | 3/2014 |
| WO | WO-2014039846 A2 | 3/2014 |
| WO | WO-2014039900 A1 | 3/2014 |
| WO | WO-2014039901 A1 | 3/2014 |
| WO | WO-2014078583 A1 | 5/2014 |
| WO | WO-2014124291 A1 | 8/2014 |
| WO | WO-2014151889 A2 | 9/2014 |
| WO | WO-2014159755 A2 | 10/2014 |
| WO | WO-2014159756 A2 | 10/2014 |
| WO | WO-2014165259 A1 | 10/2014 |
| WO | WO-2014179717 A1 | 11/2014 |
| WO | WO-2014179719 A1 | 11/2014 |
| WO | WO-2014186732 A1 | 11/2014 |
| WO | WO-2014197711 A1 | 12/2014 |
| WO | WO-2015059601 A1 | 4/2015 |
| WO | WO-2015073883 A1 | 5/2015 |
| WO | WO-2015073887 A1 | 5/2015 |
| WO | WO-2015073948 A2 | 5/2015 |

OTHER PUBLICATIONS

PCT/US2013/057837 International Preliminary Report on Patentability dated Mar. 19, 2015.
PCT/US2013/057839 International Preliminary Report on Patentability dated Mar. 19, 2015.
PCT/US2013/057866 International Preliminary Report on Patentability dated Mar. 19, 2015.
PCT/US2013/070177 International Preliminary Report on Patentability dated May 28, 2015.
PCT/US2014/015352 International Search Report and Written Opinion dated May 27, 2014.
U.S. Appl. No. 13/743,951 Office Action dated Aug. 19, 2015.
U.S. Appl. No. 14/175,584 Office Action dated Apr. 2, 2015.
U.S. Appl. No. 60/616,399, filed Oct. 5, 2004.
Co-pending U.S. Appl. No. 14/542,336, filed Nov. 14, 2014.
Co-pending U.S. Appl. No. 14/546,603, filed Nov. 18, 2014.
Co-pending U.S. Appl. No. 14/622,038, filed Feb. 13, 2015.
Fallbrook Technologies. 'NuVinci® Technology', Feb. 26, 2013; [retrieved on Jun. 5, 2014]. Retrieved from internet: <URL: https://web.archive.org/web/20130226233109/http://www.fallbrooktech.com/nuvinci-technology.
Moore et al. A Three Revolute Cobot Using CVTs in Parallel, Proceedings of IMECE, 1999, 6 pgs.
PCT/US2013/021890 International Search Report dated Apr. 10, 2013.

(56) References Cited

OTHER PUBLICATIONS

PCT/US2013/026037 International Preliminary Report on Patentability dated Aug. 28, 2014.
PCT/US2013/026037 International Search Report dated Jul. 15, 2013.
PCT/US2013/057837 International Search Report and Written Opinion dated Mar. 31, 2014.
PCT/US2013/057838 International Preliminary Report on Patentability dated Mar. 19, 2015.
PCT/US2013/057866 International Search Report dated Feb. 11, 2014.
PCT/US2013/057868 International Preliminary Report on Patentability dated Mar. 19, 2015.
PCT/US2013/058309 International Preliminary Report on Patentability dated Mar. 19, 2015.
PCT/US2013/058309 International Search Report and Written Opinion dated Feb. 11, 2014.
PCT/US2013/058318 International Preliminary Report on Patentability dated Mar. 19, 2015.
PCT/US2013/058318 International Search Report and Written Opinion dated Feb. 11, 2014.
PCT/US2013/058545 International Preliminary Report on Patentability dated Mar. 19, 2015.
PCT/US2013/058545 International Search Report and Written Opinion dated Feb. 19, 2014.
PCT/US2013/058615 International Preliminary Report on Patentability dated Mar. 19, 2015.
PCT/US2013/058616 International Preliminary Report on Patentability dated Mar. 19, 2015.
PCT/US2013/058616 International Search Report and Written Opinion dated Feb. 11, 2014.
PCT/US2013/070177 International Search Report and Written Opinion dated Apr. 14, 2014.
PCT/US2013/57838 International Search Report and Written Opinion dated Jan. 17, 2014.
PCT/US2013/57839 International Search Report and Written Opinion dated Feb. 6, 2014.
PCT/US2013/57868 International Search Report and Written Opinion dated Apr. 9, 2014.
PCT/US2013/58615 International Search Report and Written Opinion dated Feb. 11, 2014.
PCT/US2014/036621 International Search Report and Written Opinion dated Sep. 4, 2014.
PCT/US2014/036623 International Search Report and Written Opinion dated Sep. 4, 2014.
PCT/US2014/038439 International Search Report and Written Opinion dated Sep. 30, 2014.
PCT/US2014/041124 International Search Report and Written Opinion dated Oct. 15, 2014.
PCT/US2014/065909 International Search Report and Written Opinion dated Feb. 19, 2015.
PCT/US2014/25001 International Search Report and Written Opinion dated Jul. 14, 2014.
PCT/US2014/25004 International Search Report and Written Opinion dated Jul. 14, 2014.
PCT/US2014/25005 International Search Report and Written Opinion dated Jul. 14, 2014.
PCT/US2014/26619 International Search Report and Written Opinion dated Sep. 9, 2014.
PCT/US2014/65792 International Search Report and Written Opinion dated Apr. 9, 2015.
PCT/US2014/65796 International Search Report and Written Opinion dated Apr. 9, 2015.
U.S. Appl. No. 13/743,951 Office Action dated Mar. 18, 2015.
U.S. Appl. No. 61/819,414, filed May 3, 2013.
U.S. Appl. No. 14/017,054 Office Action dated Aug. 27, 2014.
U.S. Appl. No. 14/017,054 Office Action dated Dec. 12, 2014.
Wong. The Temple of VTEC Asia Special Focus on the Multimatic Transmission. Temple of VTEC Asia. 2000.
Co-pending U.S. Appl. No. 14/925,813, filed Oct. 28, 2015.
PCT/US2014/025001 International Preliminary Report on Patent ability dated Sep. 24, 2015.
PCT/US2014/025004 International Preliminary Report on Patentability dated Oct. 1, 2015.
PCT/US2014/025005 International Preliminary Report on Patentability dated Oct. 1, 2015.
PCT/US2014/026619 International Preliminary Report on Patentability dated Sep. 24, 2015.
PCT/US2015/37916 International Search Report and Written Opinion dated Sep. 29, 2015.
PCT/US2014/036621 International Preliminary Report on Patentability dated Nov. 12, 2015.
PCT/US2014/036623 International Preliminary Report on Patentability dated Nov. 12, 2015.
PCT/US2014/065796 International Preliminary Report on Patentability dated Nov. 6, 2015.
U.S. Appl. No. 14/175,584 Office Action dated Dec. 3, 2015.
U.S. Appl. No. 14/210,130 Office Action dated Nov. 20, 2015.
U.S. Appl. No. 14/542,336 Office Action dated Nov. 25, 2015.
PCT/US2014/065909 Written Opinion dated Dec. 11, 2015.
PCT/US2015/36170 International Search Report and Written Opinion dated Dec. 17, 2015.
PCT/US2015/64087 International Search Report and Written Opinion dated Feb. 11, 2016.
U.S. Appl. No. 13/743,951 Office Action dated Jan. 21, 2016.
U.S. Appl. No. 14/378,750 Office Action dated Apr. 8, 2016.

* cited by examiner

BALL TYPE CVT WITH POWERSPLIT PATHS

CROSS-REFERENCE

This application is filed pursuant to 35 U.S.C. §371 as a United States National Phase Application of International Application No. PCT/US2013/058615, filed Sep. 6, 2013, which application claims the benefit of U.S. Provisional Patent Application No. 61/698,012, filed Sep. 7, 2012 and U.S. Provisional Patent Application No. 61/789,645, filed Mar. 15, 2013, which are incorporated herein by reference in their entirety.

BACKGROUND OF THE INVENTION

Automatic and manual transmissions are commonly used on automobile vehicles. Those transmissions are becoming more and more complicated since the engine speed has to be more precisely controlled to limit the fuel consumption and the emissions of cars. This finer control of the engine speed in usual transmissions can only be done by adding more discrete step ratio gears and increasing the overall complexity and cost. Consequently, 6-speed manual transmissions then become more frequently used as are 8 or 9 speed automatic transmissions.

SUMMARY OF THE INVENTION

Provided herein is a variable transmission comprising: an input shaft; three planetary gear sets; a Ravigneaux gear set; a variator comprising, a first ring assembly, a second ring assembly, a carrier assembly; various arrangements of brakes and clutches; and the output shaft.

In some embodiments, the variable transmission comprises a continuously variable mode, an infinitely variable mode or a combination thereof.

In some embodiments the variable transmission can provide an input-coupled powersplit solution function.

In some embodiments, the transition between continuously variable transmission mode and infinitely variable transmission mode is accomplished by releasing or engaging one or more brakes, and/or alternatively releasing or engaging one or more clutches simultaneously.

In some embodiments, the variator is able to continuously change its ratios in both the continuously variable mode and infinitely variable mode to provide the best ratio achievable for the engine to optimize power consumption.

Provided herein is a variable transmission comprising: an input shaft; a first planetary gear set, a second planetary gear set and a third planetary gear set; a variator comprising a first ring assembly, a second ring assembly; a first clutch, a second clutch and a third clutch; and a first brake comprising a first brake member, wherein said input shaft is drivingly engaged with the first ring assembly of the variator, and mechanically coupleable to a first planetary sun of the first planetary gear set using the second clutch; wherein said input shaft is also drivingly engaged with the third sun of the third planetary gear set; wherein the second ring assembly is drivingly engaged with a ring of the third planetary gear set; wherein a first carrier of the first planetary gear set and a second carrier of the second planetary gear set are coupled together, wherein a third carrier of the third planetary gear set is mechanically coupleable to the first carrier of the first planetary and the second carrier of the second planetary through the third clutch; wherein the first brake member is coupled to the ring of the second planetary gear set; and wherein the first ring of the first planetary gear set is mechanically coupled to an output shaft of the variable transmission; wherein the third carrier is mechanically coupled to the second sun of the second planetary gear set; wherein the first sun of the first planetary gear set might be coupled to the first ring of the first planetary gear set with the first clutch.

In some embodiments, the variable transmission comprises two continuously variable modes, an infinitely variable mode and a direct drive mode. In some embodiments, the continuously variable modes of claim 2 comprise a low speed (CVM1) and a high speed (CVM2). In some embodiments, either or both of the continuously variable modes are enabled by blocking rotation of a variator carrier of the variator.

In some embodiments, power from the input shaft passes through the variator and simultaneously passes to a vehicle output. In some embodiments, a slipping clutch is not required between the input shaft and the variable transmission. In some embodiments, a torque converter is not required between the input shaft and the variable transmission In some embodiments, engaging the second clutch and the first brake results in an infinitely variable mode. In some embodiments, reverse and low positive speeds can be obtained when the input shaft is directly engaged to the first sun of the first planetary gear set by engaging a second clutch.

In some embodiments, engaging the first clutch and the first brake at the second planetary gear set reduces speed of the second ring assembly and allows the first planetary gear set to turn at a 1:1 ratio, thereby engaging a first continuously variable mode (CVM1).

In some embodiments, engaging the first clutch and the third clutch directly drives the variator second ring assembly linked to the first carrier through a 1;1 output ratio from the variator which drives output of the first planetary gear set, thereby engaging a second continuously variable mode (CVM2).

In some embodiments, engaging the second clutch and the first brake engage an infinitely variable mode that allows positive, negative speeds and powered neutral.

In some embodiments, engaging the first clutch and the second clutch bypasses the variator and allows output of the first planetary gear set to turn at a 1:1 ratio with the input shaft, directly engaging a vehicle output, thus engaging a direct-drive mode, In some embodiments, the direct-drive mode is more efficient than either of the two continuously variable modes. In some embodiments, the native efficiency of the variable transmission is increased by using the variator in a power-splitting continuously variable mode.

Provided herein is a variable transmission comprising: an input shaft; a variator comprising a first ring assembly, a second ring assembly; a first planetary gear set, a second planetary gear set and a third planetary gear set; a Ravigneaux gear set; a first clutch; a first brake and a second brake, wherein the input shaft is drivingly engaged with a first sun of the first planetary gear set having the second brake coupled to the ring of this first planetary; wherein the input shaft is drivingly engaged with a second carrier of the second planetary gear set; wherein a second sun of the second planetary gear set is coupled to the first ring assembly of the variator, wherein the second ring assembly is drivingly engaged with a third sun of the third planetary gear, wherein the third ring of the third planetary gear set is fixed to ground, wherein a third carrier of the third planetary gear set is drivingly engaged to a second ring of the second planetary gear set; wherein a second ring of the second planetary gear set is drivingly engaged with the first sun of the Ravigneaux gear set, the Ravigneaux gear set being mechanically coupled to the first brake via its second sun; and wherein a carrier of the Ravigneaux gear set is engaged with a first carrier of the first planetary gear set, and wherein the ring of the Ravigneaux gear set is engaged with a output of the variable transmission; wherein a first clutch engages the first sun of the Ravigneaux gear set to the carrier of the Ravigneaux gear set.

In some embodiments, the first brake holds the second sun of the Ravigneaux gear set.

In some embodiments, the variable transmission comprises a first continuously variable mode, a second continuously variable mode, and an infinitely variable mode. In some embodiments, the first sun of the Ravigneaux gear set is engaged to the third carrier of the third planetary gear set in all of the first continuously variable mode, the second continuously variable mode, and the infinitely variable mode. In some embodiments, the second brake is engaged to hold the first ring of the first planetary gear set, thereby engaging the infinitely variable mode. In some embodiments, the speed of second ring of the Ravigneaux is reduced.

In some embodiments, when the first brake is engaged the second sun is held which results in a first continuously variable mode (CVM1) of operation.

In some embodiments, when the first clutch is engaged, the Ravigneaux gear set is engaged which results in a second continuously variable mode (CVM2) of operation. In some embodiments, in the second continuously variable mode (CVM2) of operation the entire Ravigneaux gear set turns at the same speed, and achieves an efficient 1:1 ratio.

Provided herein is a variable transmission comprising: an input shaft; a variator comprising a first ring assembly, a second ring assembly; a first planetary gear set; a second planetary gear set; a third planetary gear set; a Ravigneaux gear set; a first clutch and a second clutch; and a first brake, a second brake, and a third brake, wherein the input shaft is drivingly engaged with a first sun of the first planetary gear set having the second brake coupled to the ring of this first planetary; wherein the input shaft is drivingly engaged with a second carrier of the second planetary gear set; wherein a second sun of the second planetary gear set is coupled to the first ring assembly of the variator, wherein the second ring assembly is drivingly engaged with a third sun of the third planetary gear set, wherein the third sun and the third carrier of the third planetary gear set are coupled by a second clutch; wherein the third brake is coupled to the ring of the third planetary; wherein the carrier of the third planetary gear set is drivingly engaged with a second ring of the second planetary gear set; wherein the second ring of the second planetary gear set is drivingly engaged with a first sun of the Ravigneaux gear set, and wherein the Ravigneaux gear set is coupled to the first brake by its second sun and wherein a carrier of the Ravigneaux gear set is engaged with a first carrier of the first planetary gear set; wherein a first clutch engages the first sun of the Ravigneaux gear set to the carrier of the Ravigneaux gear set.

In some embodiments, the third brake is configured to release a third ring of the third planetary gear set.

In some embodiments, the variable transmission comprises a first continuously variable mode (CVM1), a second continuously variable mode CVM2), a continuously variable mode (CVM3), and an infinitely variable mode.

In some embodiments, the first sun of the Ravigneaux gear set is engaged to the carrier of the third planetary gear set.

In some embodiments, in the first continuously variable mode (CVM1), or the second continuously variable mode (CVM2), the third brake is engaged.

In some embodiments, in the infinitely variable mode the third brake is engaged.

In some embodiments, in the third continuously variable mode (CVM3), the third brake is disengaged, the first clutch is engaged, and the second clutch is engaged.

In some embodiments, when the third sun and third carrier of the third planetary are coupled by engaging the second clutch, the third planetary gear set to turn at a 1:1 ratio.

In some embodiments, the variator continuously changes its torque ratios in the first continuously variable mode (CVM1), the second continuously variable mode CVM2), the continuously variable mode (CVM3), and the infinitely variable mode to optimize power consumption.

In some embodiments, the variable transmission comprises a traction fluid.

Provided herein is a vehicle driveline comprising a variable transmission described herein or that would be obvious to one of skill in the art upon reading the disclosure herein disposed between an engine and a vehicle output. In some embodiments, the vehicle output comprises a differential and a drive axle. In some embodiments, the vehicle driveline comprises a torsional dampener disposed between the engine and the variable transmission. In some embodiments, the torsional dampener comprises at least one torsional spring.

Provided herein is a method comprising switching between an infinitely variable mode, a continuously variable mode, and a direct drive mode using a variable transmission described herein or that would be obvious to one of skill in the art upon reading the disclosure herein.

Provided herein is a method comprising switching between an infinitely variable mode and two continuously variable modes using a variable transmission described herein or that would be obvious to one of skill in the art upon reading the disclosure herein.

Provided herein is a method comprising switching between an infinitely variable mode and three continuously variable modes using a variable transmission described herein or that would be obvious to one of skill in the art upon reading the disclosure herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Continuously Variable Transmissions or CVTs are of many types: belts with variable pulleys, toroidal, and conical, for non-limiting example. The principle of a CVT is that it enables the engine to run at its most efficient rotation speed by changing steplessly the transmission ratio in function of the speed of the car and the torque demand (throttle position) of the driver. If needed for example when accelerating, the CVT can also shift to the most optimum ratio providing more power. A CVT can change the ratio from the minimum to the maximum ratio without any interruption of the power transmission, as opposed to the opposite of usual transmissions which require an interruption of the power transmission by disengaging to shift from one discrete ratio to engage the next ratio.

A specific use of CVTs is the Infinite Variable Transmission or IVT. Where the CVT is limited at positive speed ratios, the IVT configuration can perform a neutral gear and even reverse steplessly. A CVT can be used as an IVT in some driveline configurations.

Figure 1:
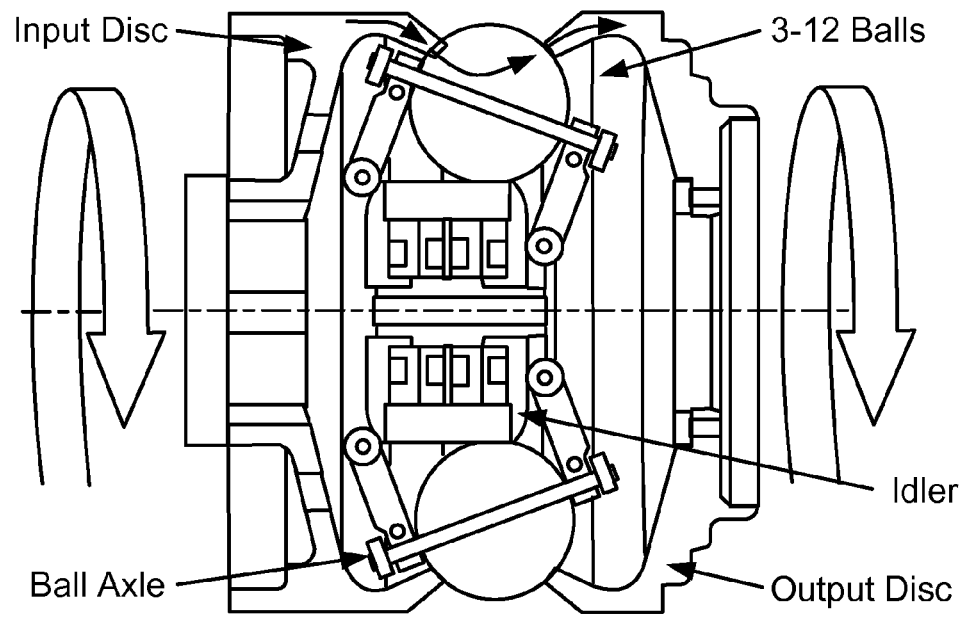
FIG. 1 is a side sectional view of a continuously variable planetary (CVP) transmission.
Figure 2:
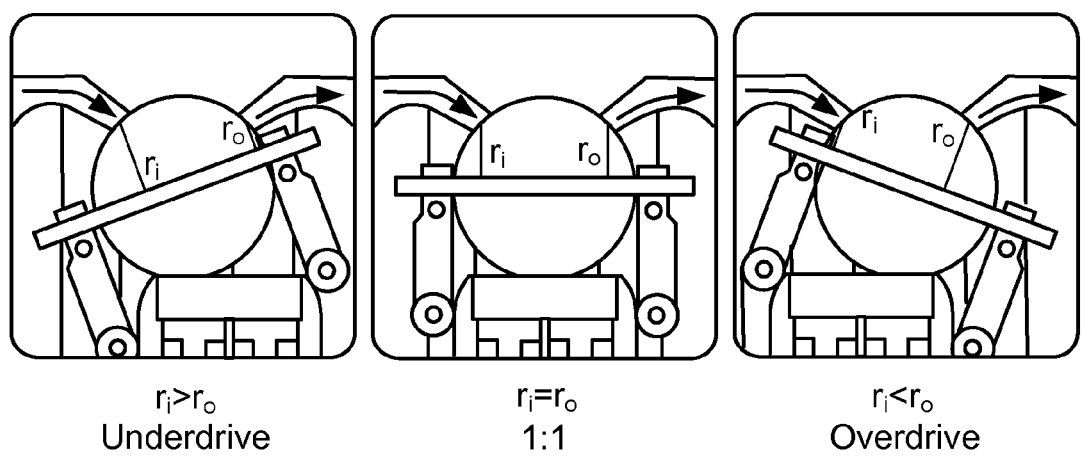
FIG. 2 is a magnified, side sectional view of a ball and ring of the CVP transmission of FIG. 1.

Provided herein are configurations based on a ball type CVT, also known as CVP (for constant variable planetary) or a variator, herein. Aspects of an example CVT are described in US20060084549 or AU2011224083A1, incorporated herein by reference in their entirety. The type of CVT used herein is comprised a variator comprising a plurality of variator balls, depending on the application, two discs or annular rings (i.e. a first ring assembly and a second ring assembly) each having an engagement portion that engages the variator balls. The engagement portions may be in a conical or toroidal convex or concave surface contact with the variator balls, as input and output. The variator may include an idler contacting the balls as well as shown on FIG. 1. The variator balls are mounted on axes, themselves held in a cage or carrier allowing changing the ratio by tilting the variator balls' axes. Other types of ball CVTs also exist, like the one produced by Milner but are slightly different. These alternative ball CVTs are additionally contemplated herein. The working principle generally speaking, of a ball-type variator of a CVT is shown in FIG. 2.

The variator itself works with a traction fluid. The lubricant between the ball and the conical rings acts as a solid at high pressure, transferring the power from the first ring assembly, through the variator balls, to the second ring assembly. By tilting the variator balls' axes, the ratio can be changed between input and output. When the axis of each of the variator balls is horizontal the ratio is one, when the axis is tilted the distance between the axis and the contact point change, modifying the overall ratio. All the variator balls' axles are tilted at the same time with a mechanism included in the cage.

Figure 3:
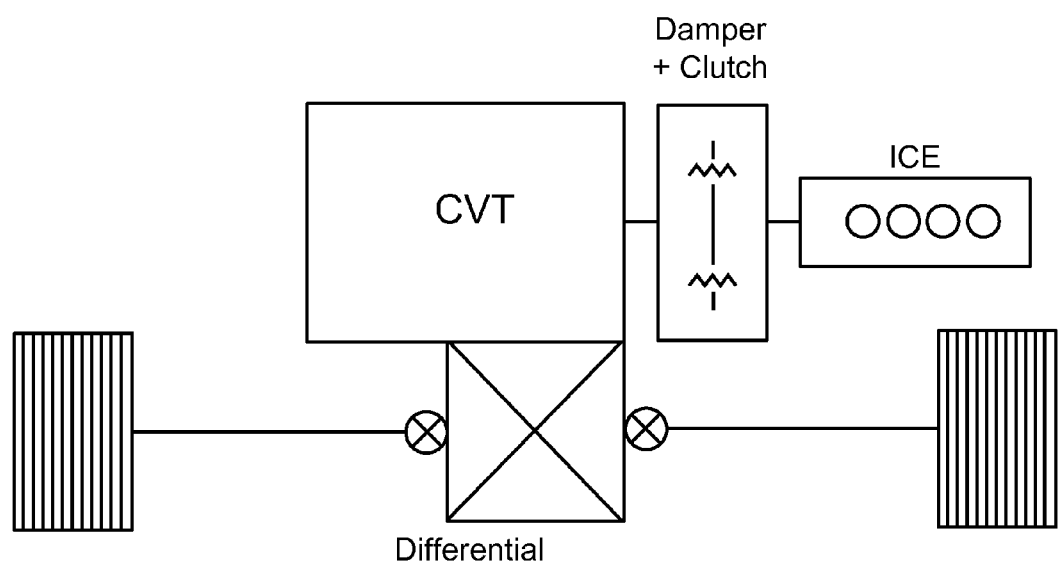
FIG. 3 FIG. 3 is a block diagram of a continuously variable transmission (CVT) used in an automobile.

In a car, the CVT is used to replace traditional transmission and is located between the engine (ICE or internal combustion engine) and the differential as shown on FIG. 3. A torsional dampener 2 (alternatively called a damper) may be introduced between the engine 100 and the CVT to avoid transferring torque peaks and vibrations that could damage the CVT. In some configurations this dampener can be coupled with a clutch for the starting function.

Figure 4:
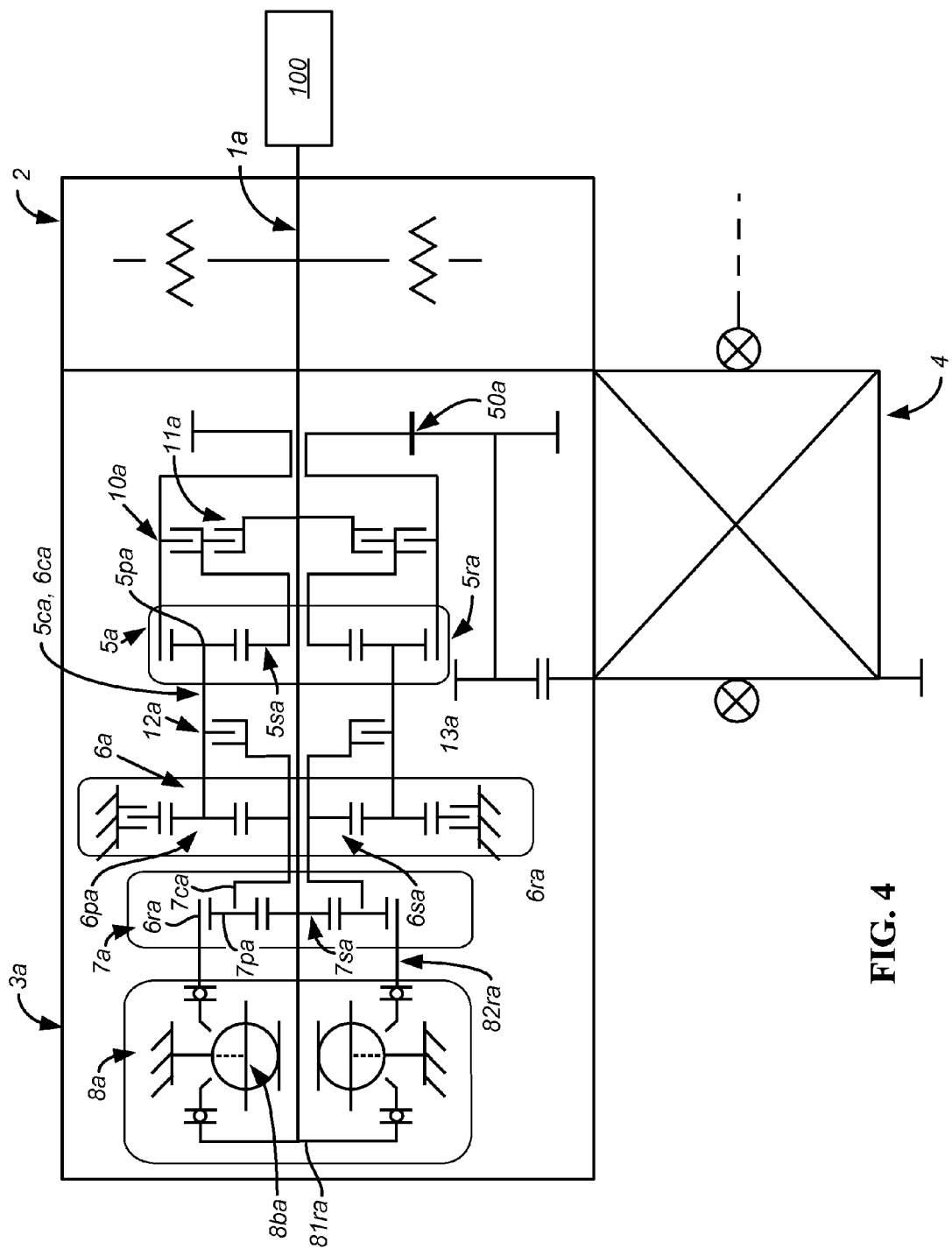
FIG. 4 is a block diagram of a continuously variable transmission (CVT) according to an embodiment of the present disclosure used in an automobile having both continuously variable modes, a direct drive mode and an infinitely variable mode.
Figure 6:
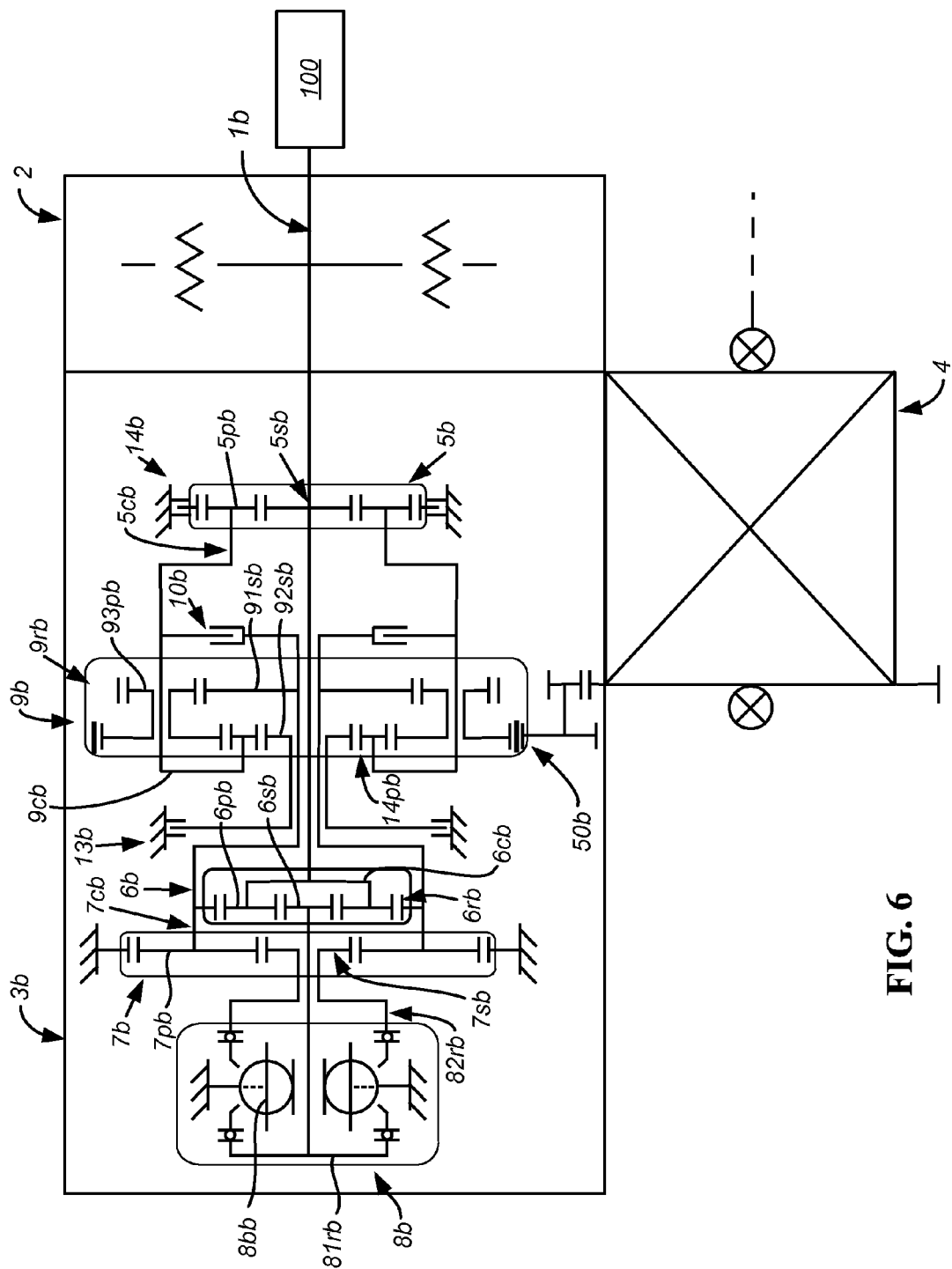
FIG. 6 is a block diagram of a continuously variable transmission (CVT) according to another embodiment of the present disclosure having a Ravigneaux gear set used in an automobile having two continuously variable modes and an infinitely variable mode.
Figure 8:
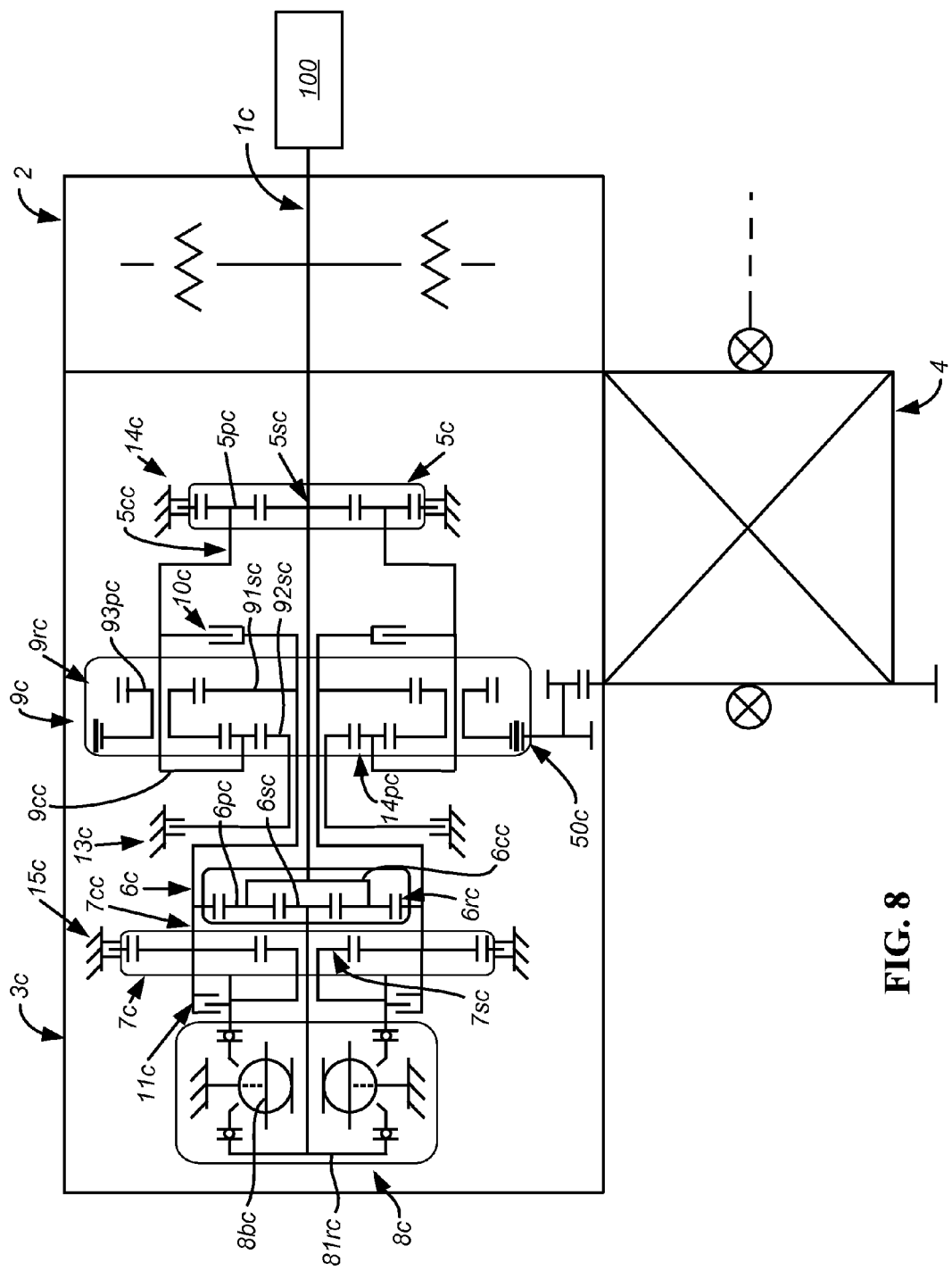
FIG. 8 is a block diagram of a continuously variable transmission (CVT) according to another embodiment of the present disclosure having a Ravigneaux gear set used in an automobile having three continuously variable modes and an infinitely variable mode.

Embodiment variable transmissions (and resulting drivelines) are shown in FIGS. 4, 6 and 8. Each of these configurations comprises a variator. Such variator comprises a first ring assembly, a second ring assembly, and a carrier assembly disposed therebetween. The carrier assembly includes a plurality of variator balls having tiltable axle shafts as described herein. In some embodiments, the first ring assembly is rotatably disposed in a housing; the first ring assembly comprises a first variator ball engagement surface that is in driving engagement with a plurality of variator balls of the carrier assembly.

A first variator ball engagement surface is formed in a distal end of the first ring assembly. When describing a ring assembly of a tilting ball variator, the term distally refers to the portion of the ring assembly closest to the balls of the variator. In some embodiments, the first variator ball engagement surface is a conical surface or a concave or convex toroidal surface in contact with or slightly spaced apart from each of the variator balls. In some embodiments, the first variator ball engagement surface is in driving engagement with each of the variator balls of the carrier assembly through one of a boundary layer type friction and an elastohydrodynamic film.

The carrier assembly of the variator may be rotatably disposed in the housing and may be drivingly engaged with the first ring assembly. The carrier assembly comprises an annular arrangement of the plurality of tiltable variator balls each having tiltable ball axle shafts. In some embodiments, each of the ball axle shafts is adjusted using a cam style tilting mechanism. In some embodiments, each of the ball axle shafts is adjusted using a split carrier axle skewing mechanism.

As depicted in FIGS. 4, 6, and 8, a second ring assembly is rotatably disposed in the housing. The second ring assembly comprises a second variator ball engagement surface that is in driving engagement with variator balls of the carrier assembly. In some embodiments, the second variator ball engagement surface is formed in a distal end of the second ring assembly. In some embodiments, the second variator ball engagement surface is a conical surface or a concave or convex toroidal surface in contact with or slightly spaced apart from each of the variator balls. In some embodiments, the second variator ball engagement surface is in driving engagement with each of the variator balls of the carrier assembly through one of a boundary layer type friction and an elastohydrodynamic film.

A ball ramp on each side of the variator provides the clamping force necessary to transfer the torque. Ball ramps, indicated in FIGS. 4, 6, and 8 by a circle between a pair of vertical lines, making up a first thrust ring on the first ring assembly and a second thrust ring on the second ring assembly are disposed between components of the variable transmission as shown to generate an amount of axial force necessary for proper operation of the variable transmission (i.e. transfer of torque); however, it is understood that the amount of axial force necessary for proper operation may be generated by a clamping mechanism (not shown) or as a load applied during assembling of the variable transmission. Thus, as depicted in FIGS. 4, 6, and 8, a ball ramp on each side of the variator provides the clamping force necessary to transfer the torque in this embodiment.

Provided herein is a series of configurations for a variable transmission comprising: an input shaft; three planetary gear sets; a variator comprising, a first ring assembly, a second ring assembly, a carrier assembly; at least one of a brake or a clutch; and the output shaft. Some of the configurations provided herein may further comprise a Ravigneaux gear set.

In some embodiments, the variable transmission comprises a continuously variable mode, an infinitely variable mode or a combination thereof. In some embodiments, the variable transmission comprises a direct drive mode.

In some embodiments the variable transmission provides an input-coupled powersplit solution function.

In some embodiments, the transition between continuously variable transmission mode and infinitely variable transmission mode is accomplished by releasing or engaging one or more brakes, and/or alternatively releasing or engaging one or more clutches simultaneously.

In some embodiments, the variator is able to continuously change its ratios in both the continuously variable mode and infinitely variable mode to provide the best ratio achievable for the engine to optimize power consumption.

Provided herein is a variable transmission comprising: an input shaft; a first planetary gear set, a second planetary gear set and a third planetary gear set; a variator comprising a first ring assembly, a second ring assembly; a first clutch, a second clutch and a third clutch; and a first brake comprising a first brake member, wherein said input shaft is drivingly engaged with the first ring assembly of the variator, and mechanically coupleable to a first planetary sun of the first planetary gear set using the second clutch; wherein said input shaft is also drivingly engaged with a third sun of the third planetary gear set; wherein the second ring assembly is drivingly engaged with a ring of the third planetary gear set; wherein a first carrier of the first planetary gear set and a second carrier of the second planetary gear set are coupled together, wherein a third carrier of the third planetary gear set is mechanically coupleable to the first carrier of and the second carrier through the third clutch; wherein the first brake member is coupled a second ring of the second planetary gear; and wherein the first ring of the first planetary gear set is mechanically coupled to the output of the transmission; wherein the third carrier is mechanically coupled to the second sun of the second planetary gear set; wherein the first sun of the first planetary gear set might be coupled to the first ring of the first planetary gear set with the first clutch.

In some embodiments, the variable transmission comprises two continuously variable modes and an infinitely variable mode and a direct drive mode. In some embodiments, the continuously variable modes of claim 2 comprise a low speed (CVM1) and a high speed (CVM2). In some embodiments, either or both of the continuously variable modes are enabled by blocking rotation of a variator carrier of the variator.

In some embodiments, power from the input shaft passes through the variator and simultaneously passes to a vehicle output. In some embodiments, wherein a slipping clutch is not required between the input shaft and the variable transmission. In some embodiments, wherein a torque converter is not required between the input shaft and the variable transmission In some embodiments, engaging the second clutch and the first brake results in an infinitely variable mode. In some embodiments, reverse and low positive speeds can be obtained when the input shaft is directly engaged to the first sun of the first planetary gear set by engaging a second clutch.

In some embodiments, engaging the first clutch and the first brake at the second planetary gear set reduces speed of the second ring assembly and allows the first planetary gear set to turn at a 1:1 ratio, thereby engaging a first continuously variable mode (CVM1).

In some embodiments, engaging the first clutch and the third clutch directly drives the variator second ring assembly linked to the first carrier of the first planetary gear set through a 1:1 output ratio from the variator which drives output of the first planetary gear set, thereby engaging a second continuously variable mode (CVM2).

In some embodiments, engaging the first clutch and the third clutch directly links the output of the first planetary gear set (at the first ring) to the third carrier in a 1:1 output ratio In some embodiments, engaging the second clutch and the first brake engage an infinitely variable mode that allows positive, negative speeds and powered neutral. (IVP).

In some embodiments, engaging the first clutch and the second clutch bypasses the variator and allows output of the first planetary gear set to turn at a 1:1 ratio with the input shaft, directly engaging a vehicle output, thus engaging a direct drive mode, In some embodiments, the direct drive mode is more efficient than either of the two continuously variable modes. In some embodiments, wherein native efficiency of the variable transmission is increased by using the variator in a power-splitting continuously variable mode.

Provided herein is a variable transmission comprising: an input shaft; a variator comprising a first ring assembly, a second ring assembly; a first planetary gear set, a second planetary gear set and a third planetary gear set; a Ravigneaux gear set; a first clutch; and a first brake and a second brake, wherein the input shaft is drivingly engaged with a first sun of the first planetary gear set having the second brake coupled to the ring of the first planetary gear set; wherein the input shaft is drivingly engaged with a second carrier of the second planetary gear set; wherein a second sun of the second planetary gear set is coupled to the first ring assembly of the variator, wherein the second ring assembly is drivingly engaged with a third sun of the third planetary gear set, the third ring of the third planetary gear set being fixed to ground wherein a third carrier of the third planetary gear set is drivingly engaged to a second ring of the second planetary gear set; wherein a second ring of the second planetary is drivingly engaged with the first sun of the Ravigneaux gear set, the Ravigneaux gear set being mechanically coupled to the first brake by its second sun; and wherein a carrier of the Ravigneaux gear set is engaged with the first carrier of the first planetary gearset; and wherein the ring of the Ravigneaux gear set is coupled to the variable transmission output; and wherein a first clutch engages the first sun of the Ravigneaux gear set to the carrier of the Ravigneaux gear set.

In some embodiments, the first brake holds the second sun of the Ravigneaux gear set. In some embodiments, the second brake holds the first ring of the first planetary gear set. In some embodiments, the ring of the Ravigneaux gear set is linked to a first carrier of the first planetary gear set.

In some embodiments, the variable transmission comprises a first continuously variable mode, a second continuously variable mode, and an infinitely variable mode. In some embodiments, first sun of the Ravigneaux gear set is engaged in all of the first continuously variable mode, the second continuously variable mode, and the infinitely variable mode to the carrier of the third planetary gear set.

In some embodiments, the second brake is engaged to hold the first ring of the first planetary gear set, thereby engaging the infinitely variable mode. In some embodiments, the speed of second ring of the Ravigneaux is reduced.

In some embodiments, when the first brake is engaged the second sun is held which results in a first continuously variable mode (CVM1) of operation.

In some embodiments, when the first clutch is engaged, the Ravigneaux gear set is engaged which results in a second continuously variable mode (CVM2) of operation. In some embodiments, in the second continuously variable mode (CVM2) of operation the entire Ravigneaux gear set turns at the same speed, and achieves an efficient 1:1 ratio.

Provided herein is a variable transmission comprising: an input shaft; a variator comprising a first ring assembly, a second ring assembly; a first planetary gear set, a second planetary gear set and a third planetary gear set; a Ravigneaux gear set; a first clutch and a second clutch; and a first brake, a second brake, and a third brake, wherein the input shaft is drivingly engaged with a first sun of the first planetary gear set having the second brake coupled to the ring of this first planetary gear set; wherein the input shaft is drivingly engaged with a second carrier of the second planetary gear set; wherein a second sun of the second planetary gear set is coupled to the first ring assembly of the variator, wherein the second ring assembly is drivingly engaged with a third sun of the third planetary gear set, wherein the third sun and the third carrier of the third planetary gear set are coupled by a second clutch; wherein the third brake is coupled to the third ring of the third planetary gear set; wherein the carrier of the third planetary gear set is drivingly engaged with a second ring of the second planetary gear set; wherein the second ring of the second planetary gear set is drivingly engaged with a first sun of the Ravigneaux gear set, the Ravigneaux gear set being coupled to the first brake by its second sun and wherein a carrier of the Ravigneaux gear set is engaged a first carrier of the first planetary gearset; wherein a ring of the Ravigneaux gear set is coupled to the variable transmission output; and wherein a first clutch engages the first sun of the Ravigneaux gear set to the carrier of the Ravigneaux gear set.

In some embodiments, the third brake is configured to release a third ring of the third planetary gear set.

In some embodiments, the variable transmission comprises a first continuously variable mode (CVM1), a second continuously variable mode (CVM2), a continuously variable mode (CVM3), and an infinitely variable mode.

In some embodiments, the first sun of the Ravigneaux gear set is engaged to the carrier of the third planetary gear set in each of the first continuously variable mode (CVM1), the second continuously variable mode (CVM2), the continuously variable mode (CVM3), and the infinitely variable mode.

In some embodiments, in the first continuously variable mode (CVM1), or the second continuously variable mode (CVM2), the third brake is engaged.

In some embodiments, in the infinitely variable mode the third brake is engaged.

In some embodiments, in the third continuously variable mode (CVM3), the third brake is disengaged, the first clutch is engaged, and the second clutch is engaged.

In some embodiments, when the third sun of the third planetary gear set and third carrier of the third planetary gear set are coupled, the third planetary gear set is configured to turn at a 1:1 ratio.

In some embodiments, the variator continuously changes its torque ratios in the first continuously variable mode (CVM1), the second continuously variable mode CVM2), the continuously variable mode (CVM3), and the infinitely variable mode to optimize power consumption.

In some embodiments, the variable transmission comprises a traction fluid.

Provided herein is a vehicle driveline comprising a variable transmission described herein or that would be obvious to one of skill in the art upon reading the disclosure herein disposed between an engine and a vehicle output. In some embodiments, the vehicle output comprises a differential and a drive axle. In some embodiments, the vehicle driveline comprises a torsional dampener disposed between the engine and the variable transmission. In some embodiments, the torsional dampener comprises at least one torsional spring.

Provided herein is a method comprising switching between an infinitely variable mode and a continuously variable mode using a variable transmission described herein or that would be obvious to one of skill in the art upon reading the disclosure herein.

Provided herein is a method comprising switching between an infinitely variable mode and two continuously variable modes using a variable transmission described herein or that would be obvious to one of skill in the art upon reading the disclosure herein.

Provided herein is a method comprising switching between an infinitely variable mode and three continuously variable modes using a variable transmission described herein or that would be obvious to one of skill in the art upon reading the disclosure herein.

Provided herein is a vehicle comprising a variable transmission described herein or that would be obvious to one of skill in the art upon reading the disclosure herein disposed between an engine and a vehicle output.

EXAMPLE 1

The embodiment of FIG. 4 depicts a variable transmission 3a comprising: a variator 8a comprising a first ring assembly 81ra, a second ring assembly 82ra, with variator balls 8ba drivingly engaged therebetween, typically mounted on a carrier (not shown); a first planetary gear set 5a comprising a first sun gear 5sa (sometimes simply referred to as "first sun"), a first ring gear 5ra (sometimes simply referred to as "first ring"), a first planet carrier 5ca (also referred to as "first carrier"), and a first set of planets gears 5pa; a second planetary gear set 6a comprising a second sun gear 6sa (sometimes simply referred to as "second sun"), a second ring gear 6ra (sometimes simply referred to as "second ring"), a second planet carrier 6ca (also referred to as "second carrier"), and a second set of planets gears 6pa, a third planetary gear set 7a comprising a third sun gear 7sa (sometimes simply referred to as "third sun"), a third ring gear 7ra (sometimes simply referred to as "third ring"), a third planet carrier 7ca (also referred to as "third carrier"), and a third set of planets gears 7pa; a first clutch 10a; a second clutch 11a; a third clutch 12a; a first brake 13a; input shaft 1a; and output 50a.

The embodiment of FIG. 4 is an input-coupled powersplit solution, meaning that a part of the power will pass through the variator while the remaining power will pass to the output through a mechanical path with higher efficiency. This power-splitting permits a relatively small variator and an increase to the native efficiency of the transmission. The central part of the configuration is the variator 8a described previously in the document. A ball ramp on each side of the variator provides the clamping force necessary to transfer the torque. The variator is only used in continuously variable mode by blocking rotation of the variator carrier of the variator.

This configuration has an infinitely variable mode to provide a standstill, reversed and starting function; two continuously variable modes, one for low speeds and one for high speeds; and a fuel efficient direct drive mode. No starting device like a slipping clutch or torque converter is required, since the IVP mode takes care of the starting function.

In the embodiment depicted in FIG. 4 a motor 100 such as an internal combustion engine (ICE) is coupled to the variator first ring assembly 81ra via input shaft 1a and can be linked to the first sun 5sa of the first planetary gear set 5a with second clutch 11a. The ICE is also linked to the sun 7sa of third planetary gear set 7a. The variator second ring assembly 82ra is coupled to the ring 7ra of third planetary gear set 7a. The carrier 7ca of third planetary gear set 7a can be directly linked to the carriers 5ca and 6ca of first planetary gear set 5a and second planetary gear set 6a with the use of the third clutch 12a, or the carrier 7ca can be reduced in speed by applying the first brake 13a to the ring 6ra of the second planetary gear set 6a. The ring 5ra of first planetary gear set 5a is coupled to the output 50a of the variable transmission 3a and goes directly to the differential 4. By engaging the first clutch 10a, the first planetary gear set 5a turns in an efficient 1:1 ratio. The carrier 7ca of third planetary gear set 7a is directly linked to the sun 6sa of second planetary gear set 6a.

Figure 5:
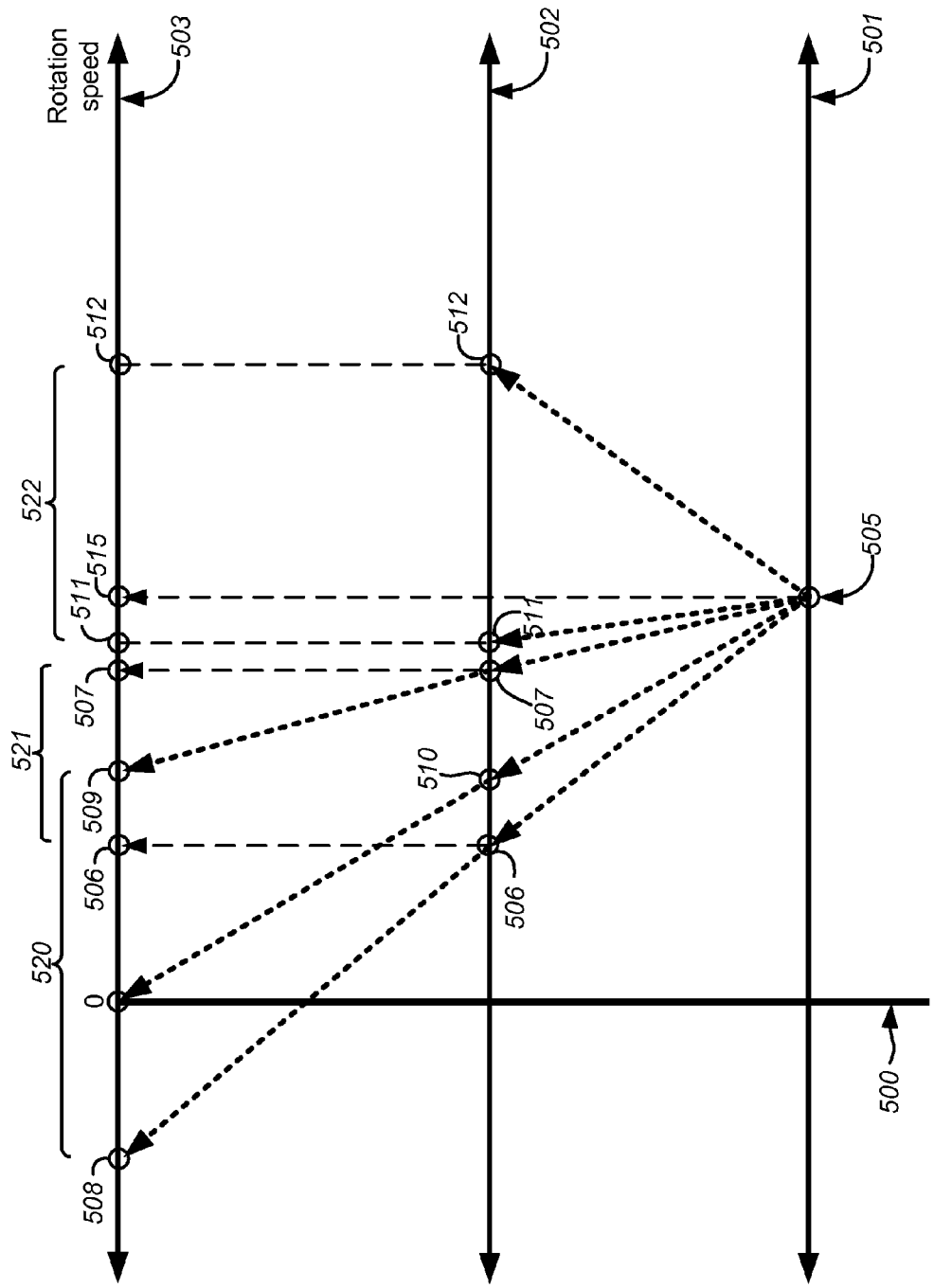
FIG. 5 is a graph of a speed diagram of the CVT of FIG. 4.

As shown in FIG. 5, the three horizontal axes 501, 502, and 503 represent respectively, from the bottom to the top, the third sun 7sa rotation speed, the first carrier 5ca rotation speed and the first ring 5ra rotation speed. An example Motor 100 speed is shown at point 505 for a reference. The output speed range of the variable transmission in IVP mode is represented by the segment 520 between speeds 508 and 509 shown corresponding to the first ring 5ra speed. Speed 510 is shown which corresponds to the carrier 5ca speed when the IVT mode is operating as a powered neutral. The output speed range of the variable transmission 3a in CVM1 is represented by the region 521 between speeds 506 and 507 shown on axis 503. The output speed range for variable transmission 3a in CVM2 is shown by the segment 522 between speeds 511 and 512. Note that for CVM1 and CVM2 the output speeds are identical to the corresponding speeds on axis 502 (shown connected by vertical arrows). This is because in such modes the first ring 5ra and first carrier 5ca are rotatably fixed to each other due to the engagement of the first clutch 10a. In direct drive the output of the variable transmission 3a matches the engine speed 505 at output speed 515.

In IVP mode, second clutch 11a and first brake 13a are closed (engaged). The sun 5sa of the first planetary gear set 5a turns at motor 100 speed and the output speed of the variator is reduced at the second planetary gear set 6a. This is then linked to the first carrier 5ca of the first planetary gear set 5a. At the first ring 5ra of the first planetary gear set 5a, (output to differential) reversed and low positive speeds (IVP) when the ICE is coupled to the first sun 5sa of the first planetary gear set 5a by applying the second clutch 11a. In this mode, powersplitting occurs two times. A part of the input power goes to the first sun 5sa of the first planetary gear set 5a and part of it goes to the variator 8a. The latter then splits the power again, in a part going to the variator first ring assembly 81ra and a part going to the third sun 7sa of the third planetary gear set 7a.

In CVM1 mode, the first clutch 10a and first brake 13a are applied. The output speed of the variator is reduced at the second planetary gear set 6a. This is then linked to the first ring 5ra (output to the differential) by applying the first clutch 10a, allowing the first planetary gear set 5a to turn at a 1:1 ratio. In this mode there is powersplitting.

In CVM2 mode, the first clutch 10a and third clutch 12a are applied. The output speed of the variator is directly linked to the first carrier 5ca of the first planetary 5a. This is then linked to the output to the differential by applying the first clutch 10, allowing the first planetary gear set 5a to turn at a 1:1 ratio. In this mode there is powersplitting.

Direct drive mode provides an efficient way for high-speed driving, like on the highway. It is obtained by engaging first clutch 10a and second clutch 11a, therefore bypassing the CVP and allowing the output planetary (first planetary gear set 5a) to turn at a 1:1 ratio. The motor 100 is then directly linked to the differential without powersplitting.

This device is able to change continuously its ratio to provide the best ratio achievable for the engine in function of the objectives of consumption of power. In a manual or automatic transmission, only some predetermined and discrete ratios are available and an interruption of the power transmission is needed to shift of ratio. The only interruptions of power in this device are the modes shifting. Other advantages of this configuration are that a small variator can be chosen; spread is larger to a traditional gearbox and the native efficiency of the transmission is increased by using the variator in a powersplit device, therefore letting a part of the power passing through a more efficient mechanical path. This particular configuration has an extra advantage by having an efficient direct drive mode for cruising speeds, bypassing the less efficient variator.

EXAMPLE 2

The embodiment of FIG. 6 depicts a variable transmission 3b comprising: a variator 8b comprising a first ring assembly 81rb, a second ring assembly 82rb, with variator balls 8bb drivingly engaged therebetween, typically mounted on a carrier (not shown); a first planetary gear set 5b comprising a first sun gear 5sb (sometimes simply referred to as "first sun"), a first ring gear 5rb (sometimes simply referred to as "first ring"), a first planet carrier 5cb (also referred to as "first carrier"), and a first set of planets gears 5pb; a second planetary gear set 6b comprising a second sun gear 6sb (sometimes simply referred to as "second sun"), a second ring gear 6rb (sometimes simply referred to as "second ring"), a second planet carrier 6cb (also referred to as "second carrier"), and a second set of planets gears 6pb, a third planetary gear set 7b comprising a third sun gear 7sb (sometimes simply referred to as "third sun"), a third ring gear 7rb (sometimes simply referred to as "third ring"), a third planet carrier 7cb (also referred to as "third carrier"), and a third set of planets gears 7pb; a Ravigneaux gear set 9b comprising a first Ravigneaux sun 91sb, a second Ravigneaux sun 92sb, a planetary carrier 9cb, a ring gear 9rb, a set of inner planet gears 93pb, and a set of outer planet gears 94pb. a first clutch 10b; a first brake 13b; a second brake 14b; input shaft 1b; and output 50b.

The embodiment depicted in FIG. 6 is an input and output coupled powersplit solution, meaning that the powersplitting occurs two times (only in infinitely variable mode, in the other modes it is an output-coupled system only). Powersplitting occurs in infinitely variable mode the first time at the first planetary gear set 5b. Part of the power flows to the Ravigneaux gear set 9b and a part flows to the second planetary gear set 6b. Powersplitting occurs at the second planetary gear set 6b. Part of the power flows through the less efficient variator 8b and a part flows through a mechanical path to the third planetary gear set 7b. This power splitting allows the embodiment have a relatively small variator and to increase the native efficiency of the transmission. The central part of that configuration is the variator described previously in the document. A ball ramp on each side of the variator provides the clamping force necessary to transfer the torque. The variator is also only used in continuously variable mode by always blocking rotation of the variator carrier of the variator.

This configuration has an infinitely variable mode to provide a standstill, reversed and starting function and two continuously variable modes, one for low speeds and one for high speeds. No starting device like a slipping clutch or torque converter is required, since the infinitely variable mode takes care of the starting function.

The motor 100, such as an ICE, is coupled to the first sun 5sb of the first planetary gear set 5b and to the second carrier 6cb of the second planetary gear set 6b. The second sun 6sb of the second planetary gear set 6b is coupled to the variator first ring assembly 81ra. The variator second ring assembly 82rb is then coupled to the third sun 7sb of the third planetary gear set 7b, the third planetary gear set being linked to the ground at its ring 7rb and to the second ring 6rb of the second planetary gear set 6b by its carrier. The second ring 7rb of the second planetary gear set 7b is coupled to the first sun 91sb of the Ravigneaux gear set 9b and can be coupled to the carrier 9cb of the Ravigneaux 9b by engaging a first clutch 10b. By engaging that first clutch 10b, the Ravigneaux 9b turns in an efficient 1:1 ratio. The carrier 9cb of the Ravigneaux 9b is the coupled to the first carrier 6cb of the first planetary gear box 6b. The ring 9rb of the Ravigneaux 9b is coupled to the variable transmission output 50b which is coupled directly to the final drive and differential (i.e. the vehicle output). Two brakes, including first brake 13b and second brake 14b allow either holding the second Ravigneaux sun 92sb of the Ravigneaux 9b (by first brake 13b) or either the first ring 5rb of the first planetary 5b (by second brake 14b).

Figure 7:
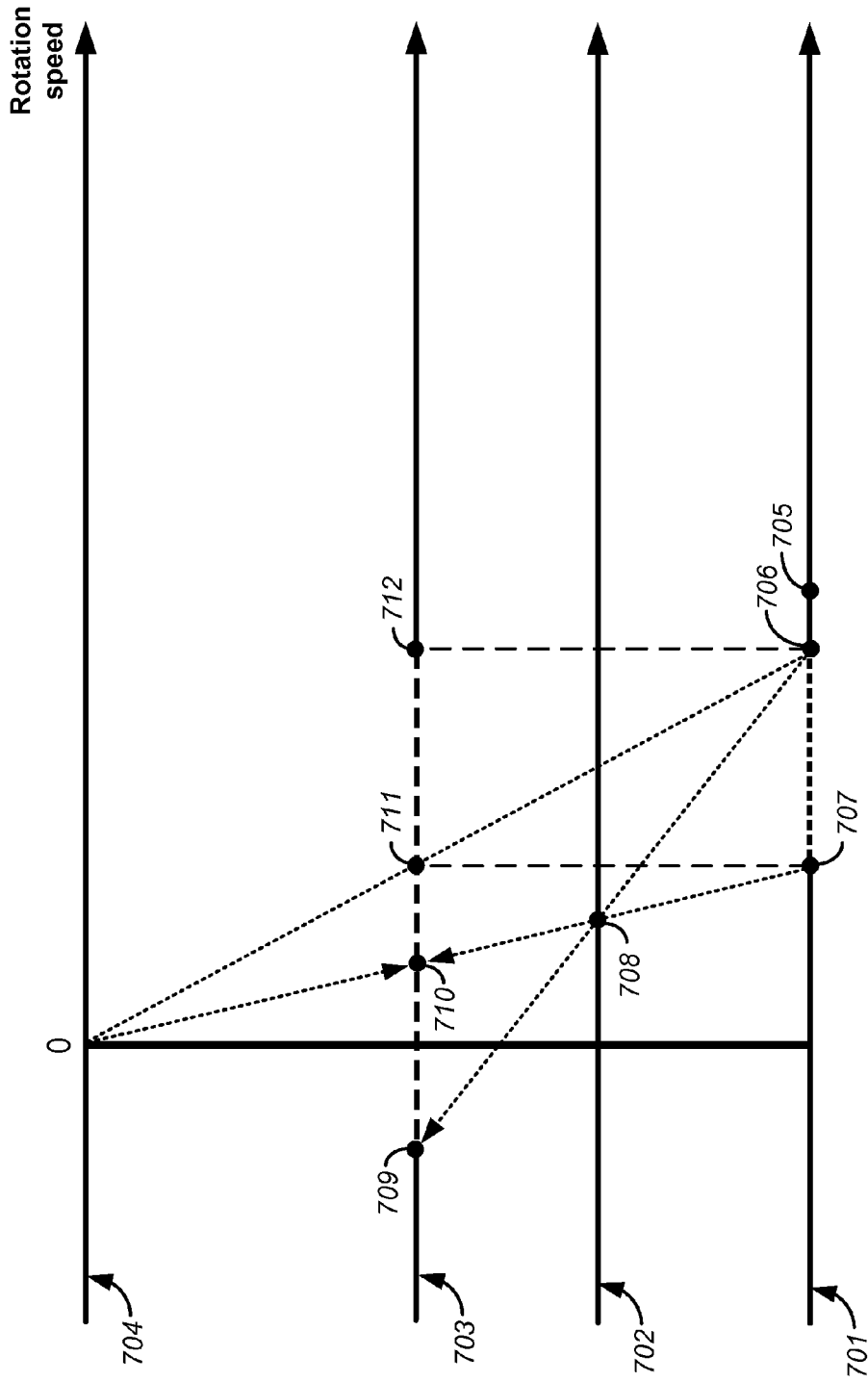
FIG. 7 is a graph of a speed diagram of the CVT of FIG. 6.

FIG. 7 shows the speed diagram of the configuration of FIG. 6 (Example 2). As shown in FIG. 7, the four horizontal axes 701-704 represent respectively, from the bottom to the top, the first Ravigneaux sun 91sb rotation speed, the Ravigneaux carrier 9cb rotation speed, the second Ravigneaux ring 9rb rotation speed, and the second Ravigneaux sun 92sb rotation speed. The variable transmission output in infinitely variable mode spans the speeds bounded by speeds 709 and 710 (at the ring 9rb). The variable transmission output speeds in CVM1 span the speeds bounded by 710 and 711, while the variable transmission output speeds in CVM2 span the speeds bounded by 711 and 712. As shown, these speed ranges form a continuous overall output range. However this is dependent upon the gear ratios chosen for the various elements of the variable transmission. The speed ratios may be chosen such that each mode's output ranges may or may not overlap. The output speed is represented by the bolded horizontal line on the carrier rotation speed line starting from the intersection of the first dotted line and the bolded horizontal line, and ending on the intersection of the second vertical dotted line and the bolded horizontal line. The output speed powersplit is the speed at the second ring assembly 82rb of the variator 8b and is bounded by speeds 707 and 706 shown on axis 701. The motor speed 705 is shown for reference as well.

The first Ravigneaux sun 91sb is coupled to the output of the powersplit in the three modes. That powersplit output speed is shown on the first Ravigneaux sun 91 sb axis.

The infinitely variable mode is activated by engaging the second brake 14b to hold the first ring 5rb of the first planetary gear set 5b. The Ravigneaux carrier 9cb of the Ravigneaux 9b being coupled to the first carrier 5cb of the first planetary gear set 5b, its speed is reduced to the point 708 shown on the axis 702. As the ring 9rb is the output of the variable transmission, the output speed achievable can be observed on the ring axis 703 of the speed diagram.

The first continuously variable mode (CVM1) is activated by holding the second Ravigneaux sun 92sb with the first brake 13b. The speed achievable can be observed in the speed diagram between speeds 710 and 711.

The second continuously variable mode (CVM2) is activated when the first clutch 10b is engaged, doing this, the whole Ravigneaux gear set 9b is turning at the same speed and achieving an efficient 1:1 ratio.

EXAMPLE 3

The embodiment of FIG. 8 demonstrates and comprises that a mode can be added to that concept of Example 2 by adding one clutch and one brake. The embodiment of FIG. 8 depicts a variable transmission 3c comprising: a variator 8c comprising a first ring assembly 81rc, a second ring assembly 82rc, with variator balls 8bc drivingly engaged therebetween, typically mounted on a carrier (not shown); a first planetary gear set 5c comprising a first sun gear 5sc (sometimes simply referred to as "first sun"), a first ring gear 5rc (sometimes simply referred to as "first ring"), a first planet carrier 5cc (also referred to as "first carrier"), and a first set of planets gears 5pc; a second planetary gear set 6c comprising a second sun gear 6sc (sometimes simply referred to as "second sun"), a second ring gear 6rc (sometimes simply referred to as "second ring"), a second planet carrier 6cc (also referred to as "second carrier"), and a second set of planets gears 6pc, a third planetary gear set 7c comprising a third sun gear 7sc (sometimes simply referred to as "third sun"), a third ring gear 7rc (sometimes simply referred to as "third ring"), a third planet carrier 7cc (also referred to as "third carrier"), and a third set of planets gears 7pc; a Ravigneaux gear set 9c comprising a first Ravigneaux sun 91sc, a second Ravigneaux sun 92sc, a planetary carrier 9cc, a ring gear 9rc, a set of inner planet gears 93pc, and a set of outer planet gears 94pc; a first clutch 10c; a second clutch 11c; a first brake 13c; and a second brake 14c; a third brake 15c; input shaft 1c; and output 50c.

The additional clutch 11c is placed between the variator second ring assembly 82rc and the third planetary gear set 7c carrier 7cc (still coupled to the second planetary ring 6rc) and the third brake 15c is allowing to release the third ring 7rc of the third planetary gear set 7c.

Figure 9:
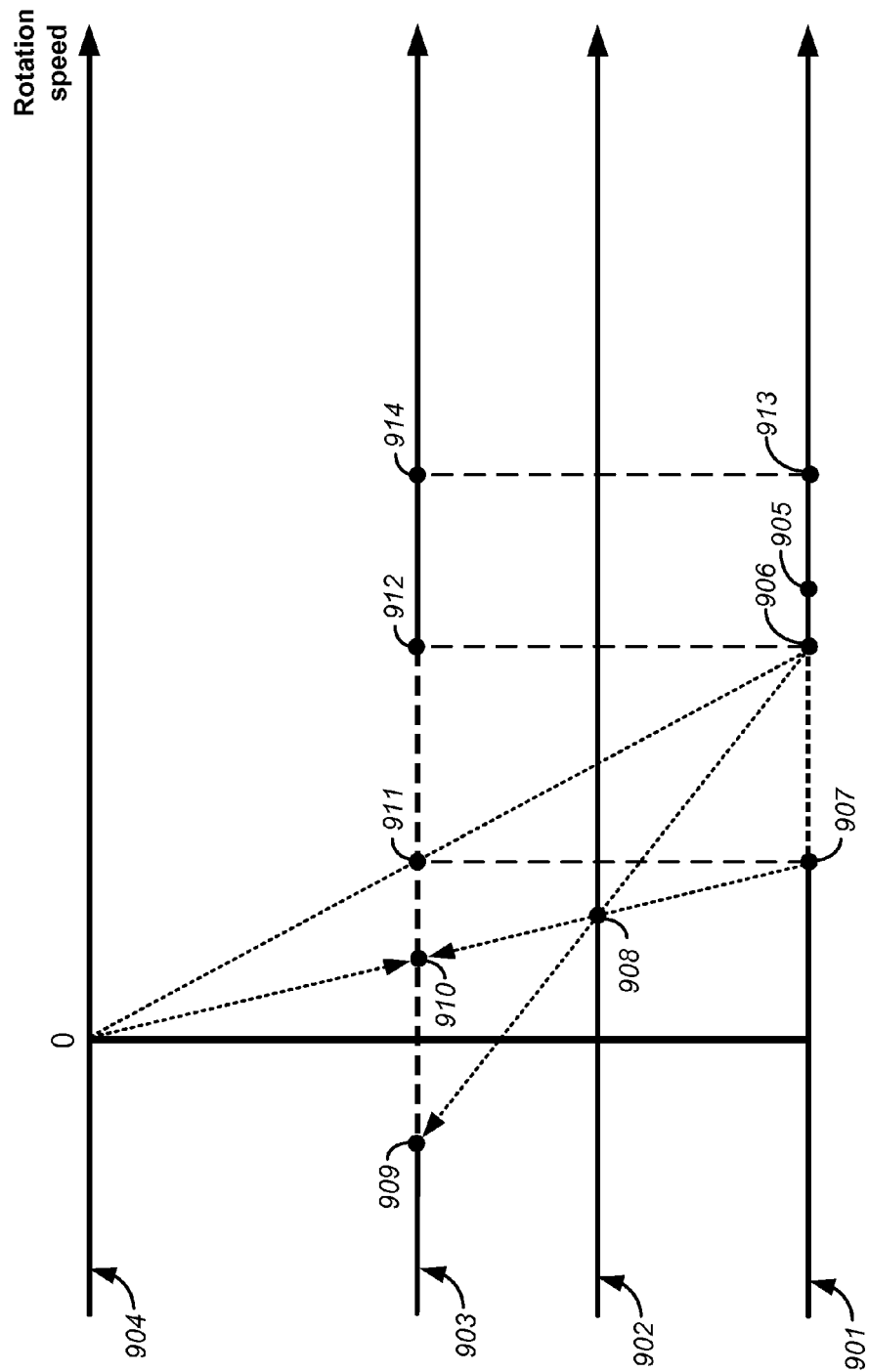
FIG. 9 is a graph of a speed diagram of the CVT of FIG. 8.

FIG. 9 shows the speed diagram of the configuration of FIG. 8 (Example 3). As shown in FIG. 9, the four horizontal axes 901-904 represent respectively, from the bottom to the top, the first Ravigneaux sun 91sc rotation speed, the second Ravigneaux carrier 9cc rotation speed, the ring 9rc rotation speed and the second Ravigneaux sun 92sc rotation speed. In IVP mode the variable transmission output speed at the ring 9rc is shown between speed points 909 and 910. In CVM1 the variable transmission output speeds are shown between speed points 910 and 911. In CVM2 the variable transmission output puts speeds lie between speed points 911 and 912. In CVM3 the variable transmission output speeds lie between speed points 912-914. The speed ranges just enumerated depend upon the gear ratios of the various components of the variable transmission. The gear ratios may be chosen such that output speed ranges of the various modes form a continuous range or a discontinuous range. The speeds 907, 906, and 913 match the speeds 911, 912, and 913 in CVM2 and CVM3 because due to the engagement of the first clutch the sun 91 sc and the ring 9rc are rotatably fixed to each other. The speed range 907-913 may also correspond to the speed at the second ring assembly 82rc of the variator 8c. An example motor speed 905 is shown on axis 901 for reference.

The additional brake 15c is engaged in the three former modes (IVP, CVM1, CVM2) while the additional clutch is released 11c.

To engage CVM3 mode, the third brake 15c is opened and the second clutch 11c is engaged, as well as the first clutch 10c. The sun 7sc and the third carrier 7cc of the third planetary gear set 7c are then coupled, making the third planetary gear set turn at an efficient 1:1 ratio.

The variable transmission of embodiment of FIG. 8 is able to change continuously its ratio to provide the best ratio achievable for the engine in function of the objectives of consumption of power. In a manual or automatic transmission, only some predetermined and discrete ratios are available and an interruption of the power transmission is needed to shift of ratio. The only interruptions of power in the variable transmission of embodiment of FIG. 8 are the modes shifting. Other advantages of this configuration are that a small variator can be chosen; spread is comparable (re: Example 2) or larger (re: Example 3) compared to a traditional gearbox and the native efficiency of the transmission is increased by using the variator in a powersplit device, therefore letting a part of the power passing through a more efficient mechanical path. This is especially true for the infinitely variable mode, where powersplitting occurs two times.

Embodiments of the variable transmission described herein or that would be obvious to one of skill in the art upon reading the disclosure herein are contemplated for use in a variety of vehicle drivelines. For non-limiting example, the variable transmissions disclosed herein may be used in bicycles, mopeds, scooters, motorcycles, automobiles, electric automobiles, trucks, sport utility vehicles (SUV's), lawn mowers, tractors, harvesters, agricultural machinery, all terrain vehicles (ATV's), jet skis, personal watercraft vehicles, airplanes, trains, helicopters, buses, forklifts, golf carts, motorships, steam powered ships, submarines, space craft, or other vehicles that employ a transmission. Provided herein is a vehicle comprising a variable transmission described herein or that would be obvious to one of skill in the art upon reading the disclosure herein disposed between an engine and a vehicle output.

While the figures and description herein are directed to ball-type variators (CVTs), alternate embodiments are contemplated another version of a variator (CVT), such as a Variable-diameter pulley (VDP) or Reeves drive, a toroidal or roller-based CVT (Extroid CVT), a Magnetic CVT or mCVT, Ratcheting CVT, Hydrostatic CVTs, Naudic Incremental CVT (iCVT), Cone CVTs, Radial roller CVT, Planetary CVT, or any other version CVT.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A variable transmission comprising:
    an input shaft;
    a first planetary gear set, a second planetary gear set and a third planetary gear set;
    a variator comprising a first ring assembly, a second ring assembly;
    a first clutch, a second clutch and a third clutch; and
    a first brake comprising a first brake member,
    wherein said input shaft is drivingly engaged with the first ring assembly of the variator, and mechanically coupleable to a first planetary sun of the first planetary gear set using the second clutch;
    wherein said input shaft is also drivingly engaged with the third sun of the third planetary gear set;
    wherein the second ring assembly is drivingly engaged with a ring of the third planetary gear set;
    wherein a first carrier of the first planetary gear set and a second carrier of the second planetary gear set are coupled together,
    wherein a third carrier of the third planetary gear set is mechanically coupleable to the first carrier of the first planetary gear set and the second carrier of the second planetary gear set through the third clutch;
    wherein the first brake member is coupled to the ring of the second planetary gear set; and
    wherein the first ring of the first planetary gear set is mechanically coupled to the output of the transmission;
    wherein the third carrier is mechanically coupled to the second sun of the second planetary gear set;
    wherein the first sun of the first planetary gear set might be coupled to the first ring of the first planetary gear set with the first clutch.

2. The variable transmission of claim 1, comprising two continuously variable modes and an infinitely variable mode and a direct drive mode.

3. The variable transmission of claim 2, wherein the continuously variable modes of claim 2 comprise a low speed (CVM1) and a high speed (CVM2).

4. The variable transmission of claim 2, wherein either or both of the continuously variable modes and infinitely variable modes are enabled by blocking rotation of a variator carrier of the variator.

5. The variable transmission of claim 2, wherein engaging the first clutch and the first brake at the second planetary gear set reduces speed of the second ring assembly and allows the first planetary gear set to turn at a 1:1 ratio, thereby engaging a first of the two continuously variable modes (CVM1).

6. The variable transmission of claim 2, wherein engaging the first clutch and the third clutch drives the output speed of the variator second ring assembly through the carrier of the first planetary gear set causing the first planetary gear set to turn at a 1:1 output ratio to the differential, thereby engaging a second continuously variable mode (CVM2) with powersplitting.

7. The variable transmission of claim 2, wherein engaging the first clutch and the second clutch bypasses the variator and allows output of the first planetary gear set to turn at a 1:1 ratio with the input shaft, directly engaging a vehicle output, thus engaging a direct drive mode.

8. The variable transmission of claim 2, wherein engaging the second clutch and the first brake engage a infinitely variable mode that allows positive speeds, negative speeds and powered neutral (IVP).

9. The variable transmission of claim 1, wherein power from the input shaft passes through the variator and simultaneously passes to a vehicle output.

10. The variable transmission of claim 1, wherein engaging the second clutch and the first brake results in an infinitely variable mode.

11. The variable transmission of claim 10, wherein reverse and low positive speeds can be obtained when the input shaft is directly engaged to the first sun of the first planetary gear set.

12. The variable transmission of claim 1, comprising a traction fluid.

13. The variable transmission of claim 1, disposed between an engine and a vehicle output, thereby forming a vehicle driveline.

14. A variable transmission comprising:
an input shaft;
a variator comprising a first ring assembly, a second ring assembly;
a first planetary gear set, a second planetary gear set and a third planetary gear set;
a Ravigneaux gear set;
a first clutch; and
a first brake and a second brake,
wherein the input shaft is drivingly engaged with a first sun of the first planetary gear set having the second brake coupled to the ring of this first planetary gear set;
wherein the input shaft is drivingly engaged with a second carrier of the second planetary gear set;
wherein a second sun of the second planetary gear set is coupled to the first ring assembly of the variator,
wherein the second ring assembly is drivingly engaged with a third sun of the third planetary gear set which is fixed to ground by its ring,
wherein a third carrier of the third planetary gear set is drivingly engaged to a second ring of the second planetary gear set;
wherein a second ring of the second planetary is drivingly engaged with the first sun of the Ravigneaux gear set which is mechanically coupled to the first brake by its second sun; and
wherein a ring of the Ravigneaux gear set is engaged with a vehicle output; and wherein a first clutch engages the first sun of the Ravigneaux gear set to a carrier of the Ravigneaux gear set.

15. The variable transmission of claim 14, wherein the first brake holds the second sun of the Ravigneaux gear set.

16. The variable transmission of claim 14, wherein the second brake holds the ring gear of the first planetary gear set.

17. The variable transmission of claim 14, wherein the carrier of the Ravigneaux gear set is linked to a first carrier of the first planetary gear set.

18. The variable transmission of claim 14, comprising a first continuously variable mode, a second continuously variable mode, and an infinitely variable mode.

19. The variable transmission of claim 18, wherein the first sun of the Ravigneaux gear set is engaged in all of the first continuously variable mode, the second continuously variable mode, and the infinitely variable mode.

20. The variable transmission of claim 14, wherein the second brake is engaged to hold the first ring of the first planetary gear set, thereby engaging the infinitely variable mode.

21. The variable transmission of claim 20, wherein the speed of second ring of the Ravigneaux is reduced.

22. The variable transmission of claim 14, wherein when the first brake is engaged the second sun is held which results in a first continuously variable mode (CVM1) of operation.

23. The variable transmission of claim 14, wherein when the first clutch is engaged, the Ravigneaux gear set is engaged which results in a second continuously variable mode (CVM2) of operation.

24. The variable transmission of claim 23, wherein in the second continuously variable mode (CVM2) of operation the entire Ravigneaux gear set turns at the same speed, and achieves an efficient 1:1 ratio.

25. The variable transmission of claim 14, further comprising a second clutch and a third brake, the second clutch operably coupled to the third planetary gear set, the third brake operably coupled to the third planetary gear set.

26. The variable transmission of claim 14, comprising a traction fluid.

27. The variable transmission of claim 14, disposed between an engine and a vehicle output, thereby forming a vehicle driveline.

* * * * *